(12) United States Patent
Atta et al.

(10) Patent No.: US 8,488,968 B2
(45) Date of Patent: Jul. 16, 2013

(54) PROGRAMMABLE OPTICAL INTERCONNECT FOR MULTI-NODE COMPUTER SYSTEMS

(75) Inventors: Emmanuel Atta, Rochester, MN (US);
Darcy Berger, Rochester, MN (US);
John R. Dangler, Rochester, MN (US);
Matthew S. Doyle, Rochester, MN (US);
Jesse M. Hefner, Rochester, MN (US);
Thomas W. Liang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 13/096,365

(22) Filed: Apr. 28, 2011

(65) Prior Publication Data

US 2012/0275798 A1    Nov. 1, 2012

(51) Int. Cl.
*H04B 10/00* (2006.01)
(52) U.S. Cl.
USPC ............................. 398/114; 398/128; 398/138
(58) Field of Classification Search
USPC .................. 398/114, 128, 138, 173, 175, 176
See application file for complete search history.

(56) References Cited

U.S. PATENT DOCUMENTS

| | | | |
|---|---|---|---|
| 6,804,422 B1 * | 10/2004 | Bajorins et al. | 385/14 |
| 7,790,495 B2 | 9/2010 | Assefa et al. | |
| 8,014,679 B2 * | 9/2011 | Yamazaki | 398/135 |
| 2005/0047795 A1 * | 3/2005 | Windover et al. | 398/164 |
| 2010/0038736 A1 | 2/2010 | Assefa et al. | |
| 2011/0024608 A1 | 2/2011 | Assefa et al. | |
| 2012/0039562 A1 * | 2/2012 | Tan et al. | 385/14 |

* cited by examiner

*Primary Examiner* — Dalzid Singh
(74) *Attorney, Agent, or Firm* — Bockhop & Associates LLC (57) ABSTRACT

A device for connecting a plurality of assemblage-mounted optical transmitters to a plurality of assemblage-mounted optical receivers mounted on a selected side of an assemblage includes a planar frame configured to be coupled to the selected side of the assemblage. A plurality of first redirecting structures is affixed to the planar frame and each is configured to receive a first optical signal from a different assemblage-mounted optical transmitter. Each first redirecting structure transmits a second optical signal, corresponding to the first optical signal, along a preselected path. A plurality of second redirecting structures is affixed to the planar frame and each is configured to receive the second optical signal from a different one of the first redirecting structures. Each of the second redirecting structures transmits a third optical signal, corresponding to the second optical signal, to a different one of the assemblage-mounted optical receivers.

20 Claims, 7 Drawing Sheets

PROGRAMMABLE OPTICAL INTERCONNECT FOR MULTI-NODE COMPUTER SYSTEMS

BACKGROUND OF THE INVENTION

1. Field of the Invention

The present invention relates to data communication systems and, more specifically, to an easily reconfigurable optical data communication system.

2. Description of the Related Art

Many existing multi-node computer systems use optical signals to communicate between the different nodes in a system. Typically, such a system employs several drawer-mounted or rack-mounted components that each include an optical transmitter and an optical receiver. The system is configured by coupling the optical transmitter of one component to the optical receiver of another component using a fiber optic cable.

While optical fiber is the most common type of channel for optical communications, other types of optical waveguides may be used to facilitate communications between digital systems. Typical optical communications transmitters employ light-emitting diodes (LEDs) or laser diodes and typical optical communication receivers employ simple photoelectric devices. Such photoelectric devices tend to require the transmitters to generate relatively high intensity signals, as they may not be able to detect high speed signal transitions in lower intensity signals.

Other systems employ electronic transmitting and receiving nodes. Such systems are typically configured by coupling the transmitting nodes of each system to the receiving nodes of other systems using coaxial cables.

Some systems employ both components with optical nodes and components with electronic nodes. In such systems, the components with optical nodes generally cannot communicate with components with electronic nodes unless the employ additional signal conversion devices.

In systems employing many components, many cables may be needed to configure the system. Such cables can become tangled and present a confusing jumble to responsible technicians. Also, such systems can be hard to reconfigure and to diagnose when problems occur.

Direct transmission of optical digital signals between two points without the use of fiber optic cables is difficult. This is because signals from a typical digital transmitter tend to be too weak to be detected by a typical optical receiver unless they are contained by an optical fiber.

Therefore, there is a need for an easily reconfigurable optical redirecting device.

SUMMARY OF THE INVENTION

The disadvantages of the prior art are overcome by the present invention which, in one aspect, is a device for connecting a plurality of assemblage-mounted optical transmitters to a plurality of assemblage-mounted optical receivers mounted on a selected side of an assemblage. A planar frame is configured to be coupled to the selected side of the assemblage. A plurality of first redirecting structures is affixed to the planar frame and each is configured to receive a first optical signal from a different one of the assemblage-mounted optical transmitters. Each of the first redirecting structures is configured to transmit a second optical signal, corresponding to the first optical signal, along a preselected path. A plurality of second redirecting structures is affixed to the planar frame and each is configured to receive the second optical signal from a different one of the first plurality of redirecting structures. Each of the second redirecting structures is configured to transmit a third optical signal, corresponding to the second optical signal, to a different one of the assemblage-mounted optical receivers.

In another aspect, the invention is a programmable optical redirecting element that includes a nanophotonic avalanche photodetector, at least first optical transmitter and a second optical transmitter and a controller. The nanophotonic avalanche photodetector is configured to detect a first optical signal. The first optical transmitter and the second optical transmitter are each responsive to the nanophotonic avalanche photodetector. The first optical transmitter is configured to transmit a second optical signal along a first optical path and the second optical transmitter is configured to transmit the second optical signal along a second optical path that is transverse to the first optical path. The first optical transmitter and the second optical transmitter are each rotatable about a common axis. The controller is configured to cause a selected one of the first optical transmitter and the second optical transmitter to transmit the second optical signal. The controller includes a selecting circuit configured to select between the first optical transmitter and the second optical transmitter based on a destination address value detected in the first optical signal.

In yet another aspect, the invention is a method of connecting a plurality of assemblage-mounted optical transmitters to a plurality of assemblage-mounted optical receivers mounted on a selected side of an assemblage. A plurality of first optical signals is received from each of the assemblage-mounted optical transmitters and a plurality of first electronic signals corresponding to each of the plurality of first optical signals is generated. A plurality of second optical signals is generated with a corresponding plurality of frame-mounted optical transmitters. Each of the frame-mounted optical transmitters is responsive to a different one of the plurality of first electronic signals and each of the plurality of second optical signals is directed to a different direction. Each of the second optical signals received and a plurality of second electronic signals corresponding to each of the plurality of second optical signals is generated. A plurality of third optical signals is generated with a corresponding plurality of frame-mounted optical transmitter, each of which is responsive to a different one of the plurality of second electronic signals. Each of the plurality of third optical signals is directed in a different one of the assemblage-mounted optical receivers.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

U.S. patent application Ser. No. 12/533,521 (published as US 2011/0024608 A1) discloses an avalanche impact ionization amplification device, which is one type of nanophotonic avalanche photodetector as used herein, and is incorporated herein by reference for the purpose of disclosing a nanophotonic avalanche photodetector. U.S. patent application Ser. No. 12/191,687 (published as US 2010/0038736 A1) shows a semiconductor photodetector that can be configured as a nanophotonic avalanche photodetector and is, therefore, incorporated herein by reference. U.S. Pat. No. 7,790,495 also shows a semiconductor photodetector that can be configured as a nanophotonic avalanche photodetector and is, therefore, incorporated herein by reference.

Figure 1:
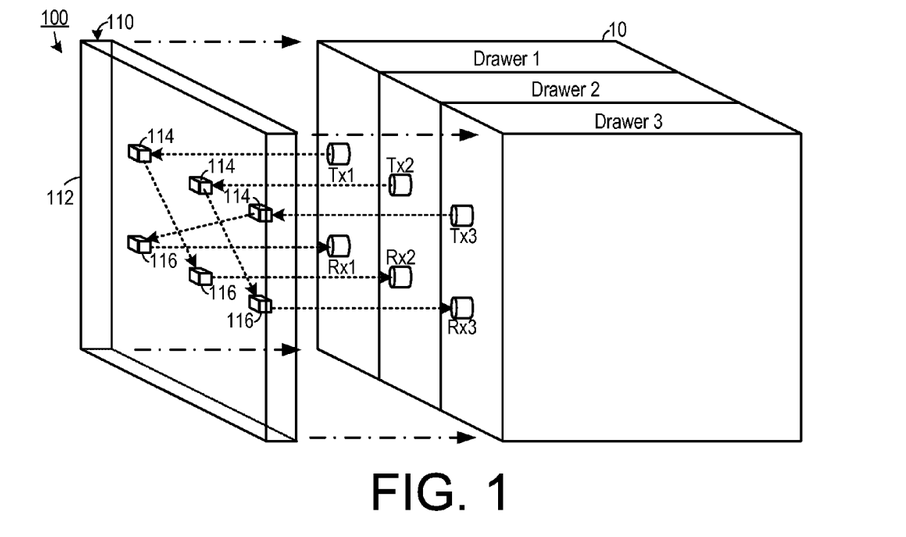
FIG. 1 is a schematic diagram of a first embodiment of a device for coupling assemblage-mounted optical transmitters to receivers.

As shown in FIG. 1, one embodiment is a device 100 for connecting optical transmitters (Tx1, Tx2 and Tx3) to optical receivers (Rx1, Rx2 and Rx3) mounted on a selected side of an assemblage 10 (such as a drawer-mounted or a rack-mounted digital system), which could include several drawers in a digital computer system. The device 100 can include a door 110 that is attachable to the back of the assemblage 10. Part of the door 110 includes a planar frame 112 A plurality of first redirecting structures 114 is affixed to the planar frame 112 Each of the first redirecting structures 114 receives a first optical signal from a different one of the assemblage-mounted optical transmitters (Tx1, Tx2 and Tx3) and transmits a second optical signal that corresponds to the first optical signal along a preselected path to a corresponding plurality of second redirecting structures 116. The second redirecting structures 116 are also affixed to the planar frame 112 and each receives a second optical signal from a different one of the first plurality of redirecting structures 114. Also, each of the second redirecting structures 116 transmits a third optical signal, which corresponds to the second optical signal, to a different one of the assemblage-mounted optical receivers (Rx1, Rx2 and Rx3). Changing the connections between transmitters and receivers can be effected simply by adjusting the aim of the first redirecting structure 114 corresponding to a given optical transmitter to the second redirecting structure 116 that transmits to the optical receiver that one desires the given optical transmitter to be connected to.

Each of the redirecting structures 114 and 116 includes a nanophotonic avalanche photodetector that is coupled to an optical transmitter. The optical transmitter typically includes a collimating lens that results in a narrow beam. The nanophotonic avalanche photodetector is capable of detecting a relatively weak incoming optical signal and quickly generating an electrical signal representative thereof. The optical transmitter is capable of quickly generating an optical signal corresponding to the electrical signal.

Figure 2:
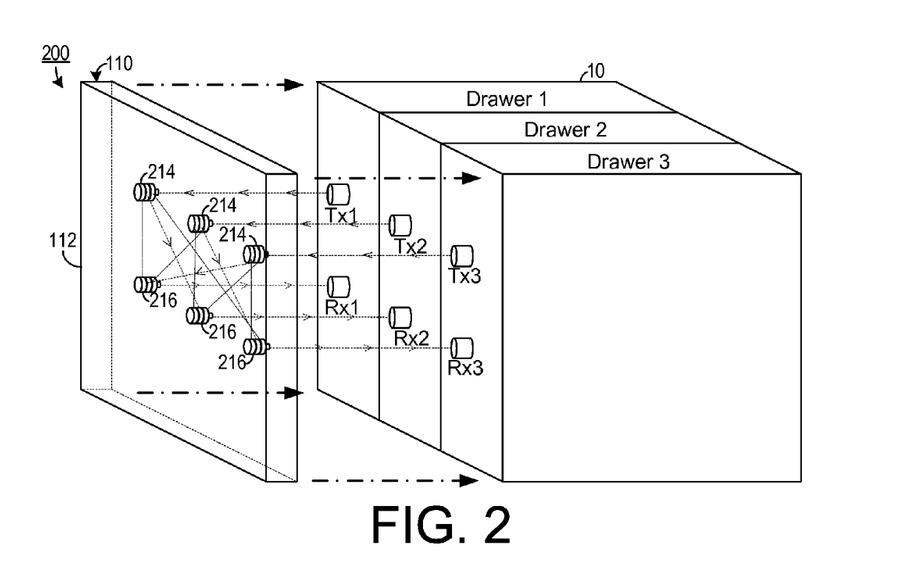
FIG. 2 is a schematic diagram of a second embodiment of a device for coupling assemblage-mounted optical transmitters to receivers.
Figure 3A:
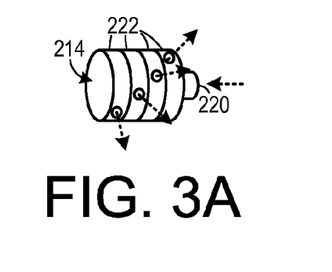
FIG. 3A is a schematic diagram of one embodiment of a redirecting structure.
Figure 3B:
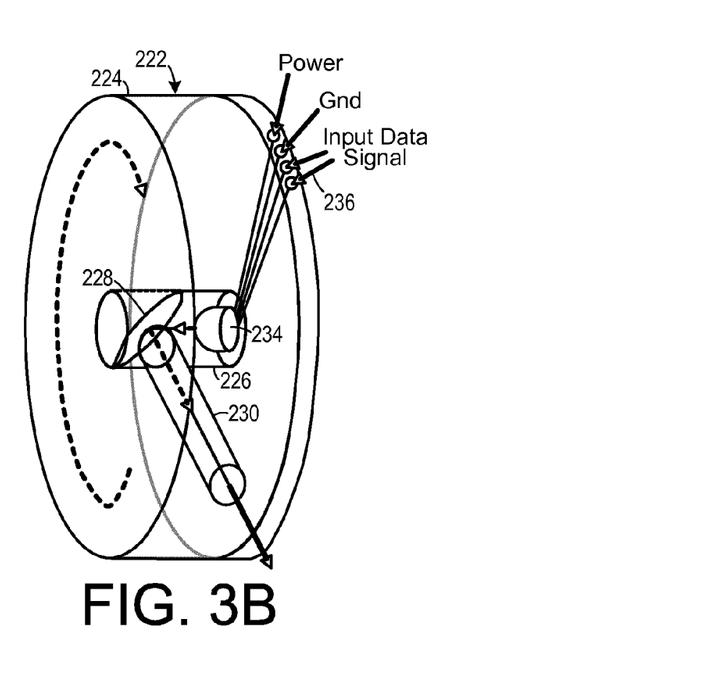
FIG. 3B is a schematic diagram of a detail of the redirecting structure shown in FIG. 3A.

A second embodiment of the device 200, as shown in FIG. 2, includes first redirecting structures 214 through which data can be output to one of several different directions and second redirecting structures 216 that are configured to receive optical signals from one of several different directions. According to this embodiment, a first programmable redirecting structure 214, as shown in FIG. 3A, includes a nanophotonic avalanche photodetector 220 that receives the incoming optical signal and generates the electrical signal, which is transmitted to a selected one of a plurality of rotatable optical transmitters 222, which generates an optical signal corresponding to the electrical signal. Each of the plurality of optical transmitters 222 is configured to transmit an optical signal in a different direction. One embodiment of an optical transmitter 222, as shown in FIG. 3B, includes a rotatable cylindrical housing 224 that defines an axial bore 234 that is connected to a transverse bore 230 extending radially therefrom. A reflector 228 (such as a mirror or a Bragg structure) is disposed within the axial bore 226 so as to reflect light received through the axial bore 226 radially through the transverse bore 230. An optical transmitter 234 is coupled to a power and ground line and is responsive an input data signal 236. The optical transmitter 234 receives an electronic data from the input data signal 236 (which corresponds to the optical data signal detected by the nanophotonic avalanche photodetector 220) and generates an optical signal representative thereof, which is reflected by the reflector 228 out through the transverse bore 230.

Figure 4A:
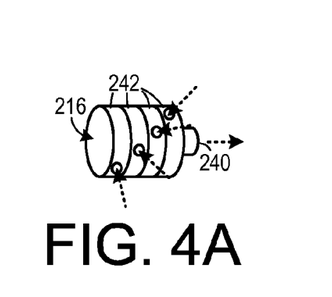
FIG. 4A is a schematic diagram of one embodiment of a redirecting structure.
Figure 4B:
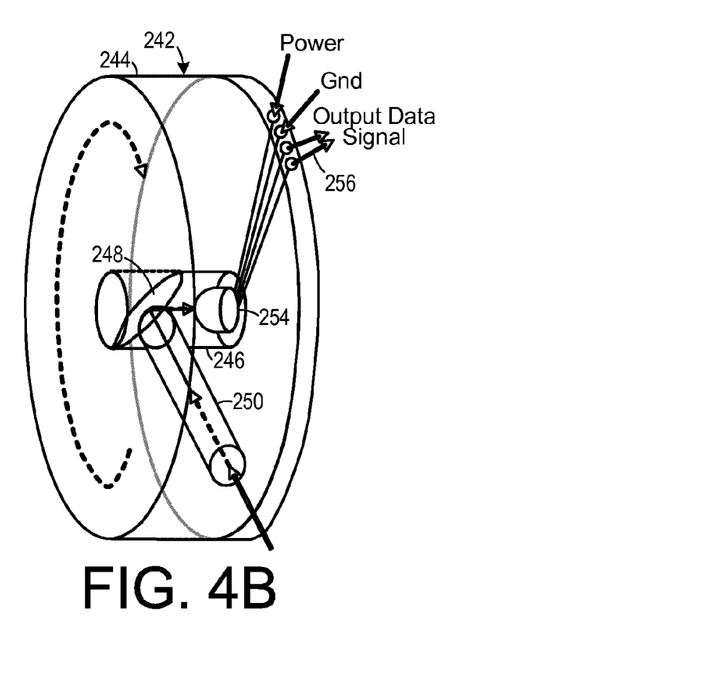
FIG. 4B is a schematic diagram of a detail of the redirecting structure shown in FIG. 4A.

A second programmable redirecting structure 216, as show in FIG. 4A, includes a plurality of rotatable optical detectors 242 that are electrically coupled to an optical transmitter 240. One of the optical detectors 242 will generate an electrical signal corresponding to an incoming optical signal and then the optical transmitter 240 will generate an optical signal corresponding to the electrical signal. One embodiment of an optical detector, as shown in FIG. 4B, includes a rotatable cylindrical housing 244 that defines an axial bore 246 that is connected to a transverse bore 250 extending radially therefrom. A reflector 248 (such as a mirror or a Bragg structure) is disposed within the axial bore 246 so as to reflect light received from the transverse bore 250 through the axial bore 246 to a nanophotonic avalanche photodetector 254. The nanophotonic avalanche photodetector 254 generates an electronic output data signal 256 that corresponds to the optical signal.

Figure 5:
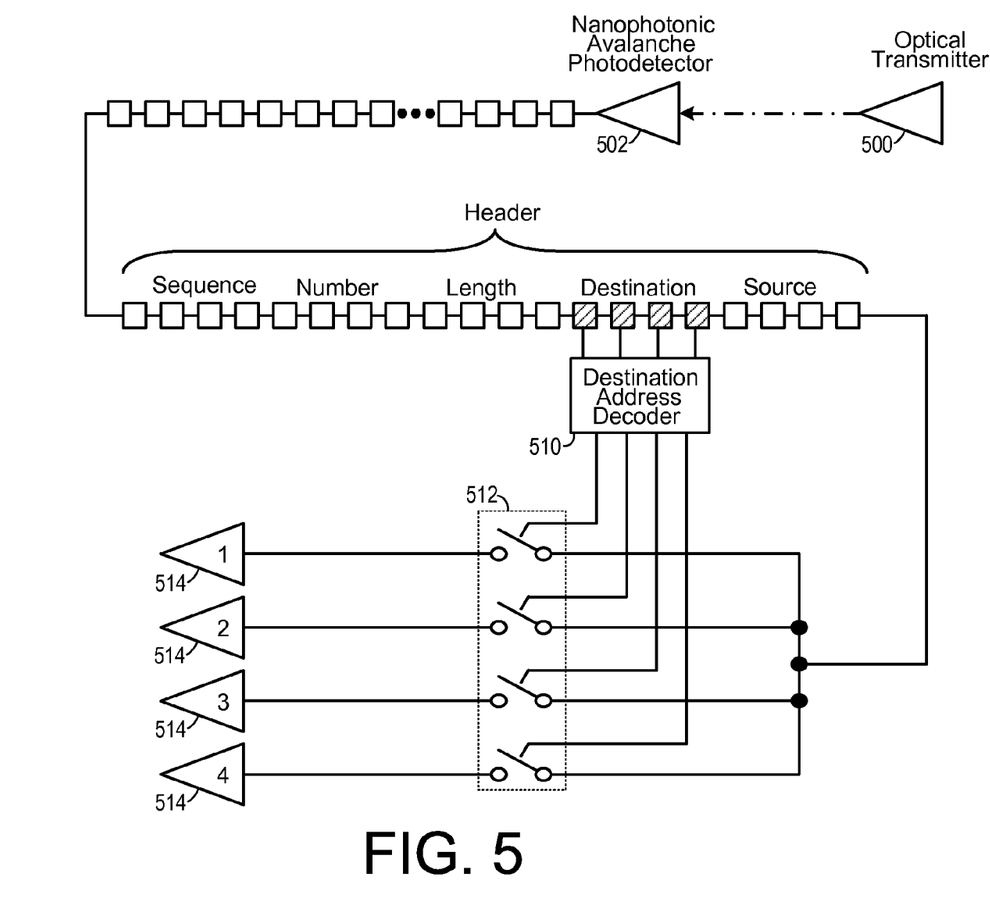
FIG. 5 is a schematic diagram of a system for decoding an address and for controlling a redirecting structure based on the address.

As shown in FIG. 5, in one method of operating a first programmable redirecting structure 214, an optical data signal is received from an optical transmitter 500 by an nanophotonic avalanche photodetector 502, which generates an electrical data signal corresponding thereto. The electronic data signal will begin with a header that includes a destination code that indicates which of the second redirecting structures 216 (of the type shown in FIG. 2) is the desired destination for the optical data signal. A decoder 510 decodes the destination code and controls a switching network 512 to couple the electrical data signal to an optical transmitter 514 that directs an optical signal to the desired second redirecting structure 216.

Figure 6:
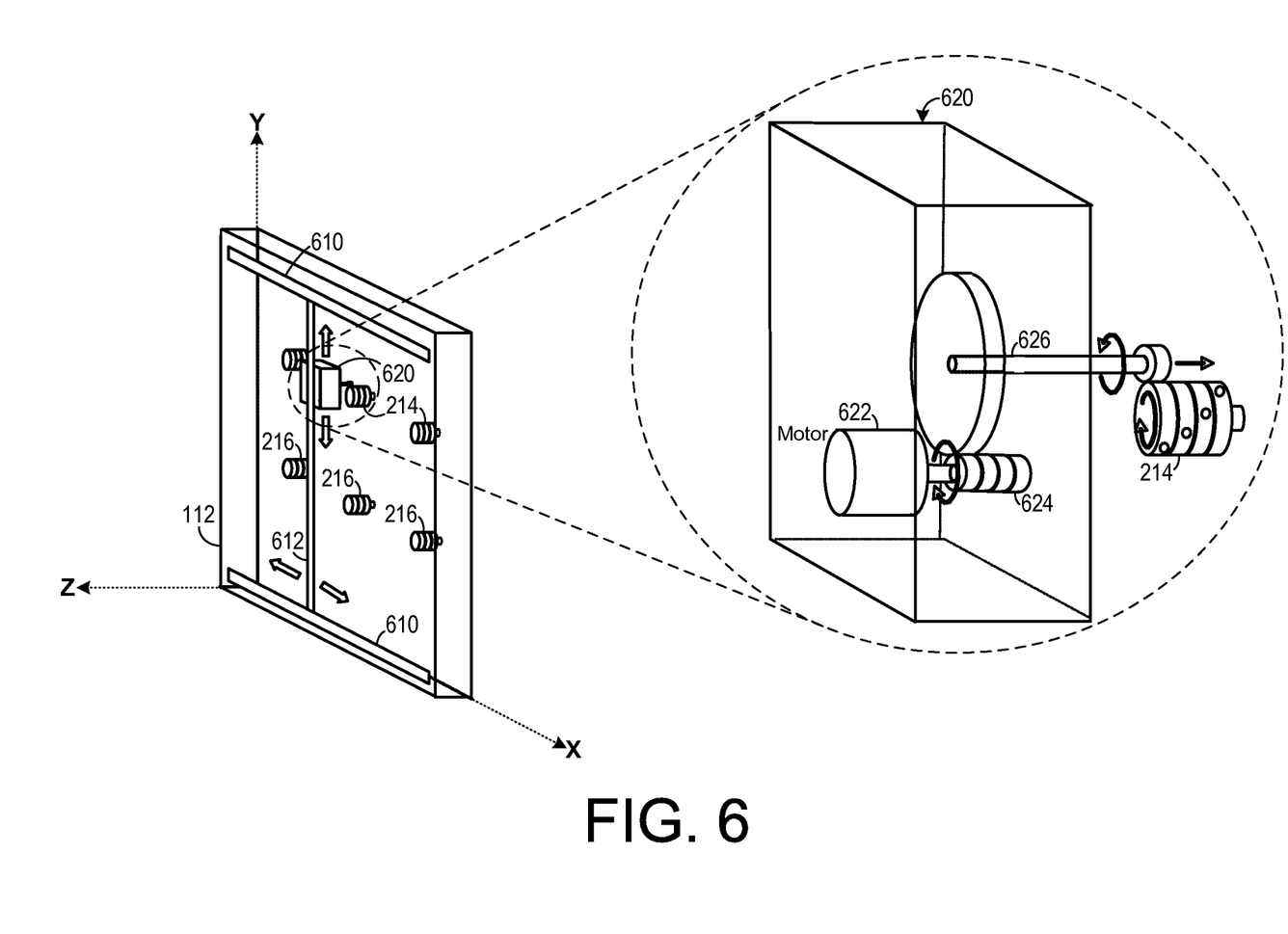
FIG. 6 is a schematic diagram of a device employing a programmable controller and a detail thereof.

In one embodiment, as shown in FIG. 6, a controller can be added to redirect the individual rotatable optical transmitters 222 and rotatable optical detectors 242. This embodiment includes a pair of horizontal rails 610 and a transverse vertical rail 612 that is movable along the horizontal rails 610. The vertical rail 612 can be moved horizontally by an electronically controlled motor (not shown). Mounted on the vertical rail 612 is a programmable rotation controller box 620 that includes a rotational motor unit 522. The rotational motor unit 522 includes a wheel or gear unit 624 configured to rotate a laterally displaceable motivator 626 (having a lateral position controlled by a movement controller, not shown) that applies rotational energy to a selected portion of redirecting structure 214 (or 216) so as to direct a selected portion to a desired redirecting structure 216 (or 214).

Figure 7:
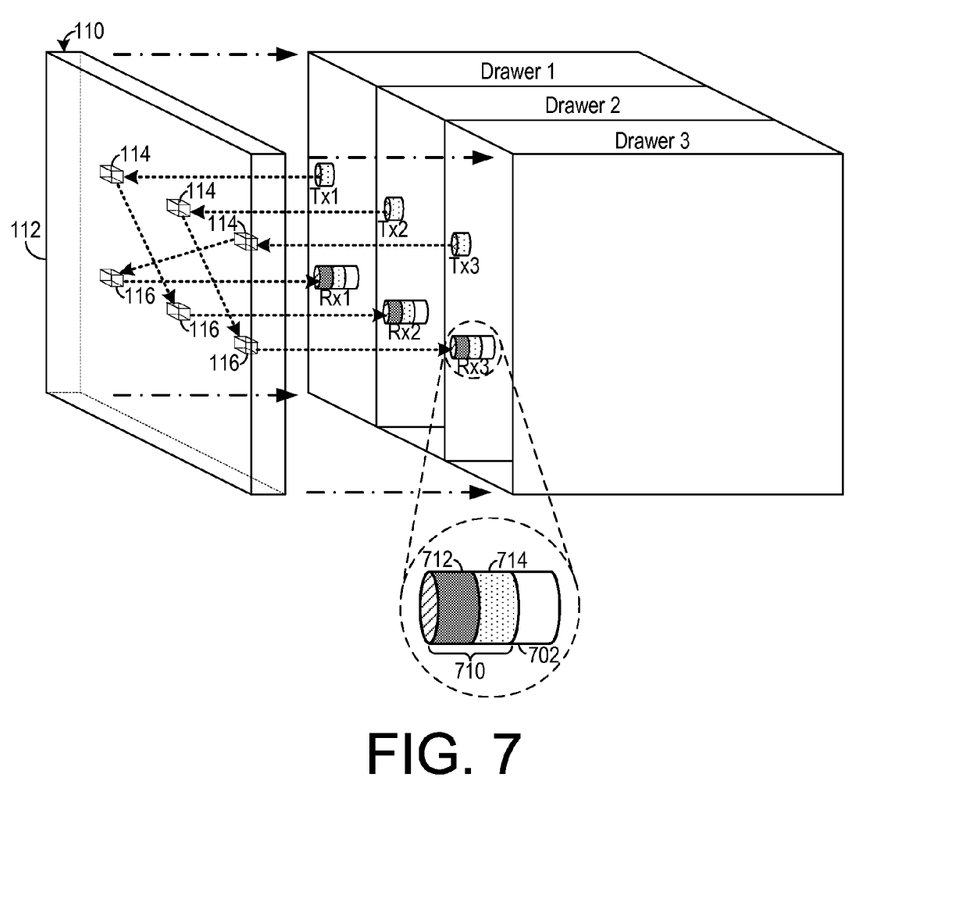
FIG. 7 is a schematic diagram of an optical redirecting system configured for retrofitting existing optical communication assemblages.

The system can be used to retrofit existing optical communication systems, as shown in FIG. 7. In a retrofitted system, each conventional receiver 702 is capped with an adapter 710 includes a nanophotonic avalanche photodetector 712 coupled to an optical transmitter 714. The adapter 710 receives an optical data signal and regenerates it quickly as a stronger optical data signal that is received by the receiver 702. In another embodiment, in retrofitting a system employing electronic communication devices, optical transmitters can be coupled to electronic transmitters to generate optical signals corresponding to the electronic signals generated by the components. Nanophotonic avalanche photodetectors can also be coupled to the electronic receivers of the components. This results in a conversion of an electronic system to an optical communicating system that can employ the redirecting device 100 disclosed above.

Figure 8:
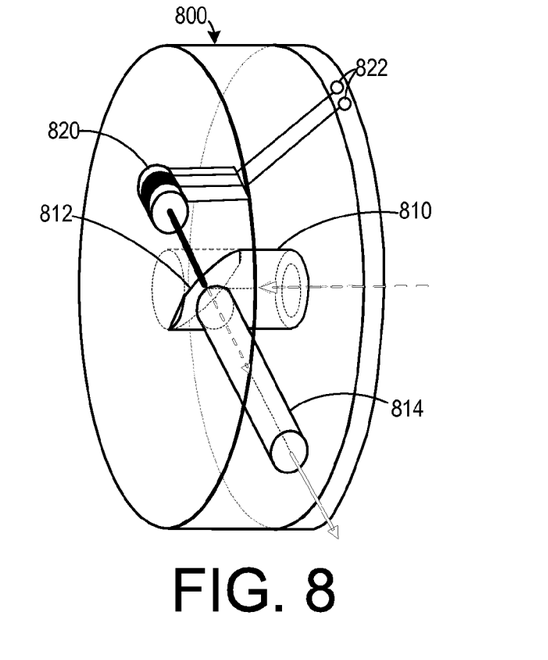
FIG. 8 is a schematic diagram of a first mirrored embodiment of a redirecting structure.

In an alternate embodiment of a first programmable redirecting structure 800, as shown in FIG. 8, the structure includes a cylindrical housing that defines an axial bore 810 that is connected to a transverse bore 814 extending radially therefrom. A reflector 812 is disposed within the axial bore 810 and is configured to be moved between a first position, in which light is redirected from the axial bore through the transverse bore 814, and a second position in which light passes straight through the axial bore 810. An electronically controlled plunger 820 (such as a solenoid) responds to a control signal 822 to move the reflector 812 between the first position and the second position.

Figure 9:
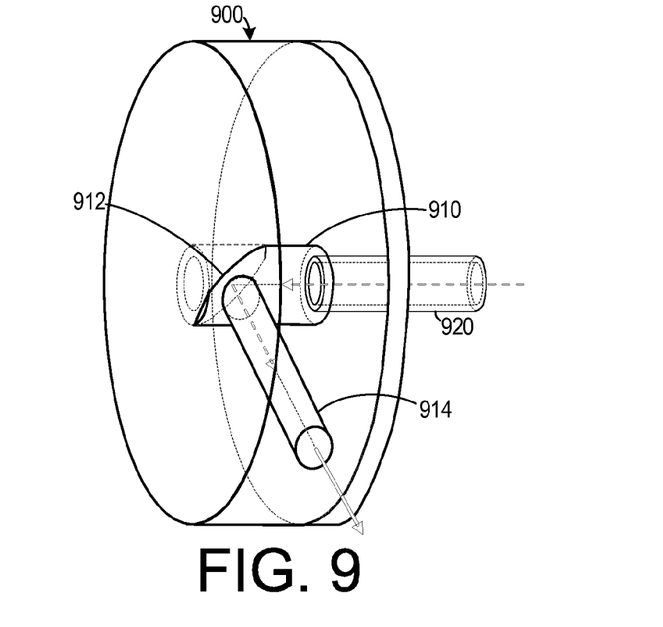
FIG. 9 is a schematic diagram of a second mirrored embodiment of a redirecting structure.

In another alternate embodiment of a first programmable redirecting structure 900, as shown in FIG. 9, the structure includes a cylindrical housing that defines an axial bore 910 that is connected to a transverse bore 914 extending radially therefrom. A spring-loaded reflector 912 is disposed within the axial bore 910 and is configured to be moved between a first position, in which light is redirected from the axial bore through the transverse bore 914, and a second position in which light passes straight through the axial bore 910. A tubular member 920 that is concentric with the axial bore 910 can be slid in and out. When slid out, the tube 820 allows the reflector 912 to move to the first position, causing light from the axial bore 910 to reflect out through the transverse bore 914. When slid in, the tubular member 920 causes the reflector 912 to pivot back to the second position and allow light to pass directly through the axial bore 910.

Figure 10:
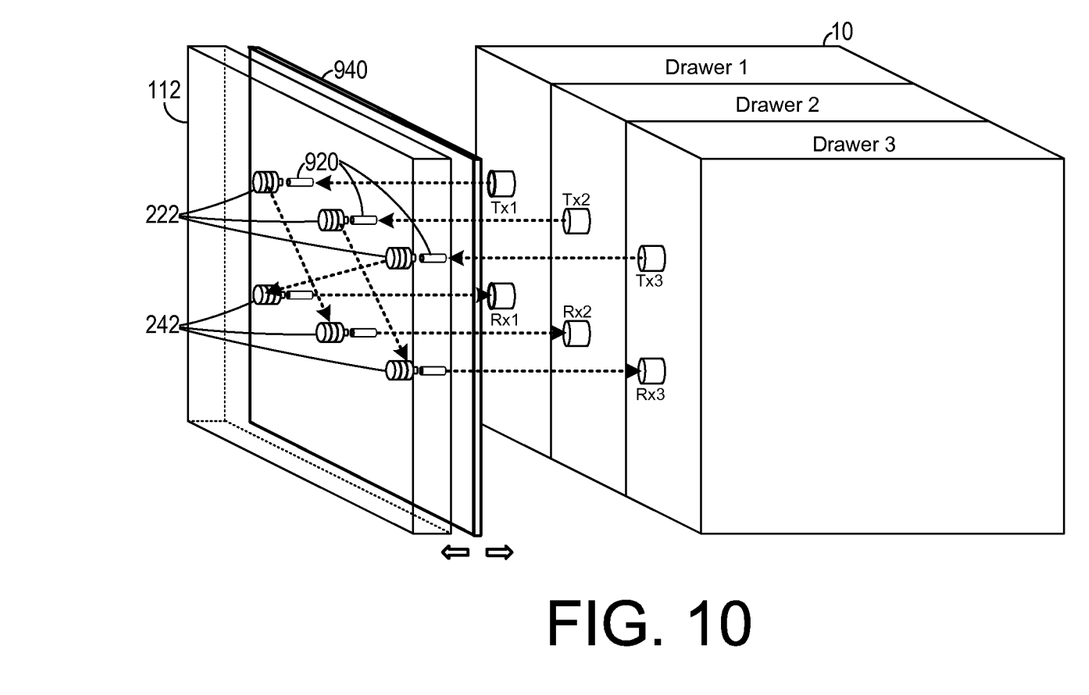
FIG. 10 is a schematic diagram of an embodiment of a system employing the embodiment shown in FIG. 9.

As shown in FIG. 10, such tubes 920 can be mounted on a laterally movable planar platform 940. The platform 940 may be moved laterally by several discrete amounts into predefined positions, wherein each amount of movement will cause the redirecting structures 222 and 242 to be in a different communications configuration.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A device for connecting a plurality of assemblage-mounted optical transmitters to a plurality of assemblage-mounted optical receivers mounted on a selected side of an assemblage,
   a. a planar frame configured to be coupled to the selected side of the assemblage;
   b. a plurality of first redirecting structures affixed to the planar frame and each configured to receive a first optical signal from a different one of the assemblage-mounted optical transmitters and each of the first redirecting structures configured to transmit a second optical signal, corresponding to the first optical signal, along a preselected path; and
   c. a plurality of second redirecting structures affixed to the planar frame and each configured to receive the second optical signal from a different one of the first plurality of redirecting structures and each of the second redirecting structures configured to transmit a third optical signal, corresponding to the second optical signal, to a different one of the assemblage-mounted optical receivers.

2. The device of claim 1, wherein each of the first redirecting structures comprises:
   a. a nanophotonic avalanche photodetector that is configured to detect the first optical signal; and
   b. an optical transmitter, in electrical communication with the nanophotonic avalanche photodetector, configured to generate the second optical signal.

3. The device of claim 1, wherein each of the second redirecting structures comprises:
   a. a nanophotonic avalanche photodetector that is configured to detect the second optical signal; and
   b. an optical transmitter, in electrical communication with the nanophotonic avalanche photodetector, configured to generate the third optical signal.

4. The device of claim 1, wherein each of the first redirecting structures comprises a first programmable element configured to transmit the second signal to a selected one of at least two of the second redirecting structures.

5. The device of claim 4, wherein the first programmable element comprises:
   a. a nanophotonic avalanche photodetector that is configured to detect the first optical signal;
   b. at least first optical transmitter and a second optical transmitter, each responsive to the nanophotonic avalanche photodetector, the first optical transmitter configured to transmit the second optical signal along a first optical path and the second optical transmitter configured to transmit the second optical signal along a second optical path, transverse to the first optical path; and
   c. a controller configured to cause a selected one of the first optical transmitter and the second optical transmitter to transmit the second optical signal.

6. The device of claim 5, wherein both the first optical transmitter and the second optical transmitter are each rotatable about a common axis that is perpendicular to the planar frame so as to be configured to be re-aimed at a selected one of the plurality of second redirecting structures.

7. The device of claim 6, further comprising a programmable rotation controller configured to rotate the first optical transmitter and the second optical transmitter associated with each of the first redirecting structures.

8. The device of claim 7, wherein the programmable rotation controller comprises:
 a. a pair of spaced apart horizontal rails;
 b. a vertical rail slidably mounted on the pair of horizontal rails;
 c. a rail motor unit configured to cause the vertical rail to move in a selected direction along the pair of spaced apart horizontal rails by a selected amount;
 d. a rotational motor unit, movably mounted on the vertical rail, the motor unit including:
  i. a rotatable contact configured to apply rotational motion to a selected one of the first optical transmitter and the second optical transmitter;
  ii. a motor configured to cause the rotatable contact to rotate by a preselected amount; and
  iii. a lateral displacement motivator configured to cause a preselected lateral displacement of the rotatable contact so that the rotatable contact engages only a selected one of the first optical transmitter and the second optical transmitter; and
 e. a movement controller configured to generate movement commands to the rail motor unit and to the rotational motor unit.

9. The device of claim 5, wherein the controller includes a selecting circuit configured to select between the first optical transmitter and the second optical transmitter based on an address value detected in the first optical signal.

10. The device of claim 1, further comprising:
 a. an assemblage-mounted nanophotonic avalanche photodetector coupled to each of the assemblage-mounted optical transmitters and configured to detect an assemblage-originated optical signal therefrom; and
 b. an assemblage-mounted optical transmitter coupled to each of the assemblage-mounted nanophotonic avalanche photodetectors and configured transmit the first optical signal corresponding to the assemblage-originated optical signal detected by the assemblage-mounted nanophotonic avalanche photodetector.

11. The device of claim 10, wherein each of the first redirecting structures and the second redirecting structures comprises a reflector.

12. The device of claim 1, wherein each of the first redirecting structures comprises:
 a. a plurality of concentric rotatable members, each defining a cylindrical passage passing axially therethrough and a radial passage coupling the cylindrical passage to a peripheral side thereof, the cylindrical passage disposed so as to receive the first optical signal therein;
 b. a reflector disposed in the cylindrical passage and hingedly attached thereto so as to have a first position and a different second position so that when the reflector is in the first position the first optical signal passing through the cylindrical passage will be reflected outwardly through the radial passage and so that when the reflector is in the second position the first optical signal will pass through the cylindrical passage; and
 c. a tube disposed in the cylindrical passage so that the reflector disposed in a selected one of the plurality of concentric rotatable members will be in the first position when the tube member is extended to a first depth will be in the second position when the tube member is extended to a second depth.

13. A programmable optical redirecting element, comprising:
 a. a nanophotonic avalanche photodetector that is configured to detect a first optical signal;
 b. at least first optical transmitter and a second optical transmitter, each responsive to the nanophotonic avalanche photodetector, the first optical transmitter configured to transmit a second optical signal along a first optical path and the second optical transmitter configured to transmit the second optical signal along a second optical path, transverse to the first optical path, the first optical transmitter and the second optical transmitter each rotatable about a common axis; and
 c. a controller configured to cause a selected one of the first optical transmitter and the second optical transmitter to transmit the second optical signal, the controller including a selecting circuit configured to select between the first optical transmitter and the second optical transmitter based on a destination address value detected in the first optical signal.

14. The programmable optical redirecting element of claim 13, wherein the selecting circuit includes:
 a. at least a first switch configured to couple an electronic representation of the first optical signal generated by the nanophotonic avalanche photodetector to the first optical transmitter when a first activation signal has been asserted and a second switch configured to couple the electronic representation of the first optical signal to the second optical transmitter when a second activation signal has been asserted;
 b. a decoder that detects the destination address in a header in the first optical signal and that asserts the first activation signal when the destination address has a first value and that asserts the second activation signal when the destination address has a second value, different from the first value.

15. A method of connecting a plurality of assemblage-mounted optical transmitters to a plurality of assemblage-mounted optical receivers mounted on a selected side of an assemblage, comprising the steps of:
 a. receiving a plurality of first optical signals from each of the assemblage-mounted optical transmitters and generating a plurality of first electronic signals corresponding to each of the plurality of first optical signals;
 b. generating a plurality of second optical signals with a corresponding plurality of frame-mounted optical transmitters, each of which is responsive to a different one of the plurality of first electronic signals, each of the plurality of second optical signals directed to a different direction;
 c. receiving each of the second optical signals and generating a plurality of second electronic signals corresponding to each of the plurality of second optical signals; and
 d. generating a plurality of third optical signals with a corresponding plurality of frame-mounted optical transmitters, each of which is responsive to a different one of the plurality of second electronic signals, each of the plurality of third optical signals directed in a different one of the assemblage-mounted optical receivers.

16. The method of claim 15, wherein the step of receiving a plurality of first optical signals is performed with a plurality of nanophotonic avalanche photodetectors.

17. The method of claim 15, wherein the step of receiving each of the second optical signals is performed with a plurality of nanophotonic avalanche photodetectors.

18. The method of claim 15, further comprising the steps of:
   a. aiming a first one of the frame-mounted optical transmitters at a first frame-mounted nanophotonic avalanche photodetector and aiming a second one of the frame-mounted optical transmitters at a second frame-mounted nanophotonic avalanche photodetector that is spaced apart from the first frame-mounted nanophotonic avalanche photodetector, wherein the first one of the frame-mounted optical transmitters and the second one of the frame-mounted optical transmitters is concentric with and electrically coupled to a selected frame-mounted nanophotonic avalanche photodetector;
   b. detecting a destination address in the first electronic signal generated by the selected frame-mounted nanophotonic avalanche photodetector;
   c. selecting between the first one of the frame-mounted optical transmitters and the second one of the frame-mounted optical transmitters based on the destination address; and
   d. causing the selected one of the first one of the frame-mounted optical transmitters and the second one of the frame-mounted optical transmitters to generate the second optical signal.

19. The method of claim 18, further comprising the step of re-aiming the first one of the frame-mounted optical transmitters to a third frame-mounted nanophotonic avalanche photodetector by rotating the first one of the frame-mounted optical transmitters about an axis.

20. The method of claim 18, wherein the step of detecting a destination address comprises the steps of:
   a. reading a portion of a header in the first electronic signal; and
   b. decoding the portion of the header.

* * * * *